United States Patent [19]

Falcon-Steward

[11] 4,166,582

[45] Sep. 4, 1979

[54] COMMINUTION OF MATERIALS

[75] Inventor: Hugh R. Falcon-Steward, Cornwall, England

[73] Assignee: English Clays Lovering Pochin & Company Limited, Cornwall, England

[21] Appl. No.: 865,242

[22] Filed: Dec. 28, 1977

[30] Foreign Application Priority Data

Jan. 19, 1977 [GB] United Kingdom ............... 2185/77

[51] Int. Cl.$^2$ ............................................. B02C 23/18
[52] U.S. Cl. .......................................... 241/16; 241/24
[58] Field of Search ............................ 241/16, 21, 24

[56] References Cited

U.S. PATENT DOCUMENTS

| | | | |
|---|---|---|---|
| 3,097,801 | 7/1963 | Dyke | 241/16 |
| 3,253,791 | 5/1966 | Lohn et al. | 241/16 X |
| 3,604,634 | 9/1971 | Windle | 241/16 |
| 3,989,195 | 11/1976 | Steward | 241/16 |

*Primary Examiner*—Howard N. Goldberg
*Attorney, Agent, or Firm*—Weingram & Klauber

[57] ABSTRACT

A method of comminuting a solid material comprising calcium carbonate to obtain a product containing at least 60% by weight of particles smaller than 2 microns equivalent spherical diameter comprises forming an aqueous suspension of the solid material which has a solids content in the range of from 5% to 50% by weight of dry solids and contains a dispersing agent, comminuting the solid material in the suspension by agitating the suspension in admixture with a particulate grinding medium, separating from the suspension thereby obtained an aqueous suspension containing comminuted solid material at least 60% by weight of which is smaller than 2 microns equivalent spherical diameter, flocculating the comminuted solid material by means of an electrolyte having a multivalent cation, and dewatering the aqueous suspension containing the comminuted and flocculated solid material.

13 Claims, No Drawings

COMMINUTION OF MATERIALS

BACKGROUND OF THE INVENTION

This invention relates to the comminution of solid materials and, more particularly, is concerned with the comminution of solid materials comprising calcium carbonate.

It is known to form an aqueous suspension of a partially comminuted calcium carbonate mineral containing a dispersing agent and then to complete comminution of the calcium carbonate mineral in the aqueous suspension at a high solids content (i.e. at a solids content ranging from about 65 to about 80% by weight of solids). Thereafter the calcium carbonate mineral is either thermally dried, for example in a spray drier, or stored or transported as an aqueous suspension, i.e. in slurry form.

The energy which must be dissipated in an aqueous suspension of a calcium carbonate mineral in order to grind the mineral to a given degree of fineness (say, until 70% by weight consists of particles have an equivalent spherical diameter smaller than 2 $\mu$m) is very much less when the grinding is performed using a suspension having a solids content of the order of 30% by weight than when the suspension has a solids content of the order of 70% by weight, i.e. better utilization of energy is obtained when the grinding is performed at a low solids content.

It is also known to comminute a calcium carbonate mineral in the form of a low solids content aqueous suspension (i.e. at a solids content up to about 40% by weight of solids) in the absence of a dispersing agent. Thereafter the aqueous suspension is dewatered (for example, by centrifugal or gravitational sedimentation and/or by filtration) to produce a cake of flocculated material having a solids content ranging from about 65 to about 80% by weight. This cake may be thermally dried to yield a lump or powder product or it may be mixed with a dispersing agent to deflocculate the solid and form a slurry which may be stored or transported in suitable containers. Unfortunately, filter cakes of calcium carbonate minerals which have been ground at a low solids content in the absence of a dispersing agent have proved to be very difficult, if not impossible, to deflocculate fully on completion of the comminution process.

British Patent Specification No. 1,472,701 describes a method of producing an easily pumpable aqueous suspension of a natural calcium carbonate mineral which contains at least 60% by weight of particles smaller than 2 microns equivalent spherical diameter, which method comprises the steps of (a) forming a mixture of water, a natural calcium carbonate mineral containing at least 60% by weight of particles smaller than 2 microns equivalent spherical diameter, and a small amount of calcium hydroxide, said small amount being at least 0.1% by weight based on the dry weight of the natural calcium carbonate mineral; and thereafter (b) deflocculating the natural calcium carbonate mineral with a dispersing agent to produce the desired easily pumpable aqueous suspension. The mixture of water, natural calcium carbonate mineral containing at least 60% by weight of particles smaller than 2 microns equivalent spherical diameter and calcium hydroxide formed in step (a) of this method can be obtained by agitating an aqueous suspension containing from 10% to 60% by weight of a calcium carbonate mineral, calcium hydroxide and a particulate grinding medium. Although the method described in British Patent Specification No. 1,472,701 has been found to work very well when the natural calcium carbonate mineral is chalk, i.e. a calcium carbonate mineral which was formed during the cretaceous period of geology from the remains of coccoliths or other minute organisms, it has been found that, when the calcium carbonate mineral is a harder mineral, such as marble or limestone, it is still often very difficult to deflocculate the calcium carbonate mineral in the aqueous suspension which is formed in step (a) of the method in order to form a suspension which is fluid and rheologically stable at high solids content.

SUMMARY OF THE INVENTION

According to the present invention there is provided a method of comminuting a solid material comprising calcium carbonate to obtain a comminuted solid material containing at least 60% by weight of particles smaller than 2 microns equivelent spherical diameter, which method comprises the steps of:

(a): forming an aqueous suspension of the solid material which has a solids content in the range of from 5% to 50% by weight of dry solids, is substantially free of large particles, and contains sufficient of a dispersing agent to prevent the formation of agglomerates during the subsequent comminution of the solid material;

(b): comminuting the solid material in the suspension formed in step (a) by agitating the suspension in admixture with a particulate grinding medium which consists of particles not larger than about 10 mm and not smaller than about 0.15 mm.

(c): separating from the product of step (b) an aqueous suspension containing comminuted solid material at least 60% by weight of which is smaller than 2 microns equivalent spherical diameter;

(d): flocculating the comminuted solid material in the separated aqueous suspension (if it is not already flocculated by the comminution thereof) by means of an electrolyte having a multivalent cation; and (e): dewatering the aqueous suspension containing the comminuted and flocculated solid material.

The dewatered solid material obtained on carrying out the method of the invention can either be thermally dried or be mixed with a small quantity of a dispersing agent to form a fluid suspension of good rheological stability.

In step (a) of the method of the invention the solid material in the aqueous suspension is preferably substantially free of particles larger than 10 mm. Most preferably, the solid material consists of particles smaller than 1 mm. A solid material in suitable sizes can be obtained by a preliminary comminution which may be performed by means of apparatus such as a jaw, cone, or gyratory crusher or a hammer, ball or rod mill or by means of a process such that as that described in Belgian Patent Specification No. 848,876. The solids content of the aqueous suspension of the solid material should be in the range 5% to 50% by weight of dry solids. If the aqueous suspension has a solids content below 5% by weight the grinding efficiency of step (b) is unacceptably low and the volume of the aqueous suspension which has to be handled per unit weight of dry solids is unacceptably high. The object of steps (b), (c) and (d) of the method of the invention is to produce an aqueous suspension, containing comminuted solid material, which is both fluid and flocculated and since a flocculated suspension having a solids content greater than 50% by weight would be extremely viscous and difficult to dewater, the aqueous suspension formed in step (a) should have a solids content not greater than 50% by weight. Preferably, the solids content of the aqueous suspension formed in step (a) is adjusted to lie in the range of from 20% to 45% by weight. The dispersing agent may be, for example, a water-soluble salt of a polyphosphoric acid, a water-soluble salt of a polysilicic acid, or preferably an organic polymeric dispersing agent such as a water-soluble salt of a polyacrylic or a polymethacrylic acid or a water-soluble copolymer of the type described in British Patent Specification No. 1,414,964. The amount of dispersing agent required is that which is just sufficient to confer negative charges on substantially all of the new crystal surfaces which are formed by the fracture of particles during the comminution step. It is believed that a new surface which is formed normally carries both positive and negative charges and therefore, in the absence of the dispersing agent, newly fractured particles tend to attract one another and form agglomerates which are not broken down if the comminuted mineral is subsequently treated with a dispersing agent. In the case of the water-soluble salts of polyacrylic or polymethacrylic acid or the copolymer dispersing agents disclosed in British Patent Specification No. 1,414,964, the amount of dispersing agent required is not more than 0.2% by weight based on the weight of dry material. Generally in the case of hard calcium carbonate materials, such as marble, vein calcite or limestone, the amount of dispersing agent required is about 0.15% by weight and in the case of natural chalk the amount of dispersing agent required is about 0.1% by weight, based on the weight of the dry material.

In step (b) of the method of the invention, the particulate grinding medium preferably consists of particles not larger than about 7 mm and not smaller than about 0.25 mm. The grinding medium may be formed of a harder material than the solid material to be ground; for example, it may consist of approximately spherical particles of silica sand. Alternatively, the particulate grinding medium may be formed of the same material as or a similar material to the solid material to be ground; for example it may consist of particles of vein calcite, limestone or marble.

In step (c) of the method of the invention separation from the product of step (b) of comminuted solid material at least 60% by weight of which is smaller than 2 microns equivalent spherical diameter can be effected by elutriation or by means of a sieve.

Thus steps (b) and (c) of the method of the invention can be conveniently carried out by agitating the aqueous suspension of the solid material and the particulate grinding medium in a vessel which is provided with an impeller mounted on a central, vertical shaft and with a sieve in the side of the vessel which allows particles to pass which have been sufficiently finely ground but retains coarser particles in the vessel. The aperture size of this sieve is conveniently about one half of the diameter of the smallest particles which are present in the particulate grinding medium. For example if the smallest particles of the particulate grinding medium have a diameter of 0.5 mm the sieve will have an aperture size of 0.25 mm.

In step (d) of the method of the invention it is preferred not to add a flocculant and, if the quantity of the dispersing agent used in step (a) has been correctly determined, the comminuted solid material will be in a weakly flocculated state on completion of comminution because the new surfaces formed by the fracture of particles during comminution will have completely absorbed all the dispersing agent which is present. If, however, after comminution the solid material is still in a deflocculated state and a flocculant has to be added, the preferred flocculants are electrolytes containing calcium or aluminium ions, for example calcium chloride, aluminium sulphate or calcium hydroxide. The flocculant used should be one which has a reversible effect. Polymeric flocculants, such as polyacrylamide and its derivatives have been found not to be suitable for use in the present invention because they flocculate the ground material too strongly. The amount of flocculant used should be the minimum which will bring about flocculation. If the amount of dispersing agent added in step (a) is judged correctly so that the comminuted solid material is weakly flocculated at the completion of comminution, not only is the cost of the flocculant avoided but also the quantity of dispersing agent necessary to form a deflocculated suspension of the materials at a high solids content after the dewatering operation is greatly reduced.

In step (e) of the method of the invention the suspension containing the flocculated solid material is preferably dewatered by filtration, but other methods such as sedimentation can be used.

If a fluid suspension at high solids content is required the cake of dewatered material formed in step (e) is mixed with a small quantity of a dispersing agent. The dispersing agent used can be the same as that used in step (a). The dispersing agent is generally added as an aqueous solution. It is possible to add it in powder form but most dispersing agents are so hygroscopic that they are not easily metered in powdered form. Additional water is not necessary in order to form a fluid suspension. For example, a powdered dispersing agent can be mixed with a filterpress cake and a fluid suspension obtained with the water present in the filterpress cake as soon as adequate mixing has taken place. Any liquid-solid mixer can be used; and a relatively slow speed mixer such as a blunger is suitable for this purpose. Even if the comminuted solid material is left in dewatered form the customer will generally wish to use it in the form of a deflocculated suspension at a high solids content, for example as a paper coating pigment or as a pigment or extender for emulsion paints, and it is therefore important that the comminuted material should have good rheological properties as a deflocculated aqueous suspension. In the case of the polyacrylate, polymethacrylate and copolymeric dispersing agents mentioned hereinabove the quantity of additional dispersing agent is usually such that the total amount of dispersing agent used in step (a) and in this operation does not exceed about 0.4% by weight based on the weight of dry material.

Solid materials which may be treated by the method of the invention include: minerals which are formed from calcium carbonate, for example limestone, vein calcite, calcite marble, or chalk; minerals which are formed from calcium carbonate and a substantial proportion of other materials, for example dolomite; mixtures of calcium carbonate minerals and other minerals such as clay and talc; and other materials comprising calcium carbonate, for example oyster or other marine shells rich in calcium carbonate.

The invention is illustrated by the following Examples.

EXAMPLE 1

Step (a)

There were formed six aqueous suspensions containing partially-comminuted samples of (i) chalk, (ii) limestone or (iii) marble. Each suspension contained 40% by weight of dry solids and either 0.1% by weight or 0.15% by weight, based on the weight of dry solids, of a sodium polyacrylate dispersing agent which had a number average molecular weight of 1650.

The partially-comminuted chalk (i) was conventionally refined chalk from Wiltshire, England having a particle size distribution such that 35% by weight consisted of particles having an equivalent spherical diameter smaller than 2 $\mu$m.

The partially-comminuted limestone (ii) was prepared by crushing raw limestone from Landelise in Belgium and then passing the crushed material through a roll mill until substantially all particles passed through a No. 10 mesh B.S. sieve (nominal aperture 1.68 mm). The milled material was then mixed with sufficient water to form a suspension containing 40% by weight of dry solids and was further ground for 2 hours in a pebble mill with 1½ inch (38 mm) diameter flint pebbles. The ground material was screened through a No. 300 mesh B.S. sieve (nominal aperture 53 $\mu$m), filtered and dried.

The partially-comminuted marble (iii) was prepared by treating raw marble from Carrara, Italy in the same manner as the limestone.

Step (b)

Each of the six aqueous suspensions was agitated in a sand grinding vessel with Leighton Buzzard sand which consisted of approximately spherical particles of silica sand having diameters in the range of from 0.5 to 1 mm. The amount of sand used was such that its volume was equal to the volume of the suspension, and agitation of the contents of the sand grinding vessel was continued until the particle size distribution of the comminuted material was such that approximately 90% by weight consisted of particles having an equivalent spherical diameter smaller than 2 $\mu$m.

Steps (c) and (d)

After each suspension had been ground by agitation with sand as described above, the ground material (which was found to be flocculated) was in each case screened through a No. 300 mesh B.S. sieve).

Step (e)

The screened suspensions were dewatered by filtration.

Each of the filter cakes was then mixed with a quantity of water containing the minimum quantity of the sodium polyacrylate dispersing agent which would just deflocculate the material and form a fluid suspension. In each case the filter cake was first mixed by hand with the solution of dispersing agent to form a rough slurry which was then subjected to vigorous mixing for 30 seconds in a laboratory homogeniser. The viscosity of each of the suspensions was then measured by means of a Brookfield viscometer using Spindle No. 4 at a speed of 100 rpm. Further small additions of the dispersing agent were then made and the viscosity of each of the suspensions was measured after each additional quantity of dispersing agent had been thoroughly mixed with the suspension. The viscosity of each of the suspensions was then plotted against the total quantity of dispersing agent present (i.e. including the initial 0.1% or 0.15% by weight) and the minimum viscosity and the quantity of dispersing agent required to achieve that minimum were recorded. The results obtained are set forth in Table 1 below.

TABLE 1

| | Initial quantity of dispersing agent (% by wt.) | | | | | |
|---|---|---|---|---|---|---|
| | 0.1% | | | 0.15% | | |
| | total quantity of dispersing agent (% by wt) | minimum viscosity (centipoise) | solids content of suspension (% by wt) | total quantity of dispersing agent (% by wt) | minimum viscosity centipoise | solids content of suspension (% by wt) |
| Chalk | 0.18 | 100 | 69.9 | 0.24* | 87* | 69.6* |
| Limestone | 0.21 | 117 | 69.2 | 0.22 | 70 | 70.0 |
| Marble | 0.20 | 88 | 71.4 | 0.22 | 72 | 71.9 |

*The chalk to which 0.15% by weight of dispersing agent had been initially added was found still to be deflocculated on completion of the sand grinding operation. The minimum quantity of calcium chloride which would just flocculate the ground material was therefore added before the suspension was filtered.

These results show that a good combination of low viscosity and low dispersing agent consumption are obtained with limestone and marble with an initial dispersing agent dose of 0.15% by weight, and with chalk with an initial dispersing agent dose of 0.1% by weight.

EXAMPLE 2

Steps (a) and (b)

Aqueous suspensions of partially comminuted limestone and marble (identical to that used in Example 1) were subjected to a sand grinding operation under the same conditions as described in Example 1 except that the initial quantity of dispersing agent used was 0.2% by weight. At the end of the sand grinding operation the limestone contained 86% by weight of particles having an equivalent spherical diameter smaller than 2 microns, and the marble contained 83% by weight of particles having an equivalent spherical diameter smaller than 2 microns.

Step (c)

The suspension of the comminuted minerals (which were found to be still deflocculated at the completion of the sand grinding operation) were each screened through a No. 300 mesh B.S. sieve.

Step (d)

The screened suspensions were then treated with the minimum quantity of calcium chloride required to flocculate the comminuted solid material.

Step (e)

The suspension of screened and flocculated solid material was then dewatered by filtration.

The minimum viscosity and the corresponding total quantity of dispersing agent were determined as described in Example 1; and the results obtained are set forth in Table 2 below.

TABLE 2

| | Total of dispersing agent (% by wt) | minimum viscosity (centipoise) | solids content of suspension (% by wt) |
|---|---|---|---|
| Limestone | 0.28 | 67 | 73.0 |
| Marble | 0.30 | 123 | 74.2 |

These results show that a low viscosity suspension at about 70% by weight of solids is still obtainable if the initial quantity of dispersing agent is 0.2% by weight, but at the expense of an increased total consumption of dispersing agent and the added cost of a flocculant.

EXAMPLE 3

Steps (a) and (b)

Three samples (A, B and C) of partially comminuted limestone (each identical to that used in Example 1) were each formed into aqueous suspensions and each was deflocculated with 0.2% by weight of the same sodium polyacrylate dispersing agent, and then subjected to sand grinding under the same conditions, as described in Example 1. At the completion of the sand grinding operation each of the suspensions was found to be deflocculated and to contain 87% by weight (A), 84% by weight (B) and 96% by weight (C), respectively, of particles smaller than 2 microns.

Step (c)

The suspensions were screened through a No. 300 mesh B.S. sieve.

Step (d)

Sample A was flocculated with the minimum quantity of calcium chloride; sample B was flocculated with the minimum quantity of aluminium sulphate; and sample C was flocculated with the minimum quantity of calcium hydroxide.

Step (e)

The suspensions were then each dewatered by filtration.

The cakes obtained by dewatering were dried at 80° C. The dry material in each case was redispersed in water to form a suspension containing about 70% by weight of solids, and sufficient of the dispersing agent was added just to form a fluid suspension. The minimum viscosity and the corresponding total quantity of dispersing agent were determined as described in Example 1, and the results obtained are set forth in Table 3 below.

TABLE 3

| Flocculant | Total quantity of dispersing agent (% by wt) | Minimum viscosity (centipoise) | solids content of suspension (% by wt) |
|---|---|---|---|
| Calcium chloride | 0.27 | 47 | 70.2 |
| Aluminium sulphate | 0.34 | 53 | 68.9 |
| Calcium hydroxide | 0.32 | 82 | 70.2 |

These results show that, if it is necessary to use a flocculant, of the three flocculants tested calcium chloride gives the best combination of low viscosity and small total quantity of dispersing agent.

EXAMPLE 4 (Comparison)

A sample of Carrara marble chips was crushed to pass through a No. 10 mesh B.S. sieve (nominal aperture 1.68 mm), and the crushed material was then mixed with water to form a suspension containing 40% by weight of dry solids which were then ground for 5 hours in a pebble mill using 38 mm flint pebbles. The partially-comminuted product was then screened through a No. 300 mesh B.S. sieve, dewatered by filtration and dried at 80° C.

The dried product was then mixed with sufficient water to form a suspension containing 30% by weight of dry solids, and with 0.3% by weight, based on the weight of dry solids, of calcium hydroxide but no dispersing agent. The resultant suspension was then subjected to attrition grinding, following the process described in British Patent Specification No. 1,472,701 using Leighton Buzzard sand comprising particles having sizes in the range 0.5-1 mm, the quantity of sand used being such that the volume ratio of sand to suspension was 1.08:1. Sand grinding was continued until the particle size distribution of the ground marble was such that about 90% by weight of the particles had an equivalent spherical diameter smaller than 2 μm.

The suspension of ground material was screened through a No. 300 mesh B.S. sieve and dewatered by filtration to form a cake containing 70.6% by weight of solids. The cake was thoroughly mixed with 0.15% by weight, based on the weight of dry solids, of the sodium polyacrylate dispersing agent used in Example 1, and the viscosity of the resultant suspension was measured with a Brookfield Viscometer using Spindle No. 3 at 50 rpm. Further quantities of the dispersing agent were then thoroughly mixed into the suspension and the viscosity measured after each addition. The results are set forth in Table 4 below.

TABLE 4

| Total quantity of dispersing agent (% by wt) | Viscosity (centipoise) | Solids content of suspension (% by wt.) |
|---|---|---|
| 0.15 | 1967 | 70.5 |
| 0.30 | 801 | 70.4 |
| 0.50 | 789 | 70.3 |

It will be seen that the suspensions were very much more viscous than those prepared by the method of the invention even when large amounts of dispersing agent were used.

A further batch of the partially comminuted marble was subjected to sand grinding as described above but in the absence of the calcium hydroxide. After screening and dewatering the ground material, it was found to be impossible to deflocculate the cake to form a fluid suspension even when 0.6% by weight of dispersing agent, based on the weight of dry solids, was used.

EXAMPLE 5

Step (a)

A sample of dolomite (which had been ground in a dry fluid-energy mill until it had a particle size distribution such that there were no particles coarser than 1 mm., 48% by weight consisted of particles having an equivalent spherical diameter larger than 10 μm, and 17% by weight consisted of particles having an equivalent spherical diameter smaller than 2 μm) was formed into an aqueous suspension containing 40% by weight of the dry, ground dolomite and 0.15% by weight, based on the weight of dry dolomite, of the same sodium polyacrylate dispersing agent as was used in Example 1.

Step (b)

The suspension formed in step (a) was introduced into a sand grinding vessel containing Leighton Buzzard sane consisting of particles with diameters in the range of from 0.5 mm to 1 mm, the amount of said used being such that its volume was equal to the volume of the suspension, and agitation was continued until a given amount of energy had been dissipated in the suspension. The particle size distribution pf the finely ground dolomite was then determined. The experiment was then repeated two more times with different amounts of energy being dissipated in the suspension. The results are set forth in Table 5 below.

TABLE 5

| Energy dissipated in the suspension per unit wt. of dry dolomite kilojoules per kilogram | % by wt. of particles | |
|---|---|---|
| | larger than 10 μm | smaller than 2 μm |
| 0 | 48.0 | 17 |
| 529 | 1.3 | 68 |
| 727 | 0.3 | 82 |
| 1190 | 0.2 | 97 |

Steps (c) and (d)

After each suspension had been ground by agitation with sand, the ground material (which was found to be flocculated) was in each case screened through a No. 300 mesh B.S. sieve.

Step (e)

Each of the screened suspensions was dewatered in a filterpress.

Each of the filter cakes was redispersed in a blunger to which was added, in aqueous solution, a further small quantity of the same sodium polyacrylate dispersing agent. In each case a fluid suspension was formed which had good rheological stability.

EXAMPLE 6

Step (a)

Samples of partly refined kaolin (having a particle size distribution such that 17% by weight consisted of particles having an equivalent spherical diameter larger than 10 μm and 46% by weight consisted of particles having an equivalent spherical diameter smaller than 2 μm) and samples of a partially comminuted marble (having a particle size distribution such that 53% by weight consisted of particles having an equivalent spherical diameter larger than 10 μm and 11% by weight consisted of particles having an equivalent spherical diameter smaller than 2 μm) were mixed in different proportions and the resultant mixtures formed into aqueous suspensions containing 40% by weight of dry solids. No particles larger than 1 mm were present and each suspension also contained 0.15% by weight, based on the weight of total dry solids, of the same sodium polyacrylate dispersing agent as was used in Example 1.

Step (b)

Each suspension was introduced into a sand grinding bessel containing Leighton Buzzard sand consisting of particles with diameters in the range of from 0.5 mm to 1 mm, the amount of sand in each case being such that its volume was equal to the volume of the suspension, and agitation was continued until the proportion by weight of particles in the kaolin/marble mixture having an equivalent spherical diameter smaller than 2 μm was about 80%. The composition of each mixture, the energy dissipated and the particle size parameters of the ground mixtures are set forth in Table 6 below.

TABLE 6

| Wt ratio of Kaolin: marble | Energy dissipated in suspension per unit wt. of dry solids kilojoules per kilogram | % by wt of particles | |
|---|---|---|---|
| | | larger than 10 μm | smaller than 2 μm |
| 80:20 | 330 | 2 | 78 |
| 60:40 | 344 | 3 | 80 |
| 40:60 | 317 | 4 | 78 |

Steps (c) and (d)

After each suspension had been ground, as described above, the ground material (which was found to be flocculated) was in each case screened through a No. 300 mesh B.S. sieve.

Step (e)

Each suspension was dewatered in a filterpress.

Each of the filter cakes was redispersed in a blunger to which was added in aqueous solution, a further small quantity of the same sodium polyacrylate dispersing agent. In each case a fluid suspension was formed which had good rheological stability.

I claim:
1. A method of comminuting a solid material comprising calcium carbonate to obtain a comminuted solid material containing at least 60% by weight of particles smaller than 2 microns equivalent spherical diameter, which method comprises the steps of:
   (a) forming an aqueous suspension of the solid material which has a solids content in the range of from 5% to 50% by weight of dry solids, is substantially free of large particles, and contains sufficient dispersing agent to prevent the formation of agglomerates during the subsequent comminution of the solid maerial;
   (b) comminuting the solid material in the suspension formed in step (a) by agitating the suspension in admixture with a particulate grinding medium which consists of particles not larger than about 10 mm and not smaller than about 0.15 mm;
   (c) separating from the product of step (b) an aqueous suspension containing comminuted solid material at least 60% by weight of which is smaller than 2 microns equivalent spherical diameter;

(d) flocculating the comminuted solid material in the separated aqueous suspension, if it is not presently in a flocculated condition, by means of an electrolyte having a multivalent cation; and (e) dewatering the aqueous suspension containing the comminuted and flocculated solid material.

2. A method according to claim 1, wherein the dewatered solid material obtained on carrying out step (e) is thermally dried.

3. A method according to claim 1, wherein the dewatered solid material obtained on carrying out step (e) is mixed with a small quantity of a dispersing agent to form a fluid suspension of good rheological stability.

4. A method according to claim 1, wherein in step (a) the solid material in the aqueous suspension is substantially free of particles larger than 10 mm.

5. A method according to claim 1, wherein in step (a) the solid material in the aqueous suspension consists of particles smaller than 1 mm.

6. A method according to claim 1, wherein in step (a) the solids content of the aqueous suspension of the solid material is adjusted to lie in the range of from 20% to 45% by weight.

7. A method according to claim 1, wherein in step (a) the dispersing agent is an organic polymeric dispersing agent.

8. A method according to claim 1, wherein in step (a) the amount of dispersing agent used is that which is just sufficient to confer negative charges on substantially all of the new crystal surfaces which are formed by the fracture of particles during the comminution in step (b).

9. A method according to claim 1, wherein in step (b) the particulate grinding medium consists of particles ranging in size from 0.25 mm to 7.0 mm.

10. A method according to claim 1, wherein in step (d) the flocculant is an electrolyte containing calcium ions.

11. A method according to claim 1, wherein in step (d) the amount of flocculant used is the minimum which will bring about flocculation of the comminuted solid material.

12. A method according to claim 1, wherein the solid material comprising calcium carbonate is selected from the group comprising limestone and marble.

13. A method according to claim 1, wherein in step (d) the flocculant is an electrolyte containing aluminum ions.

* * * * *